Figure 1:
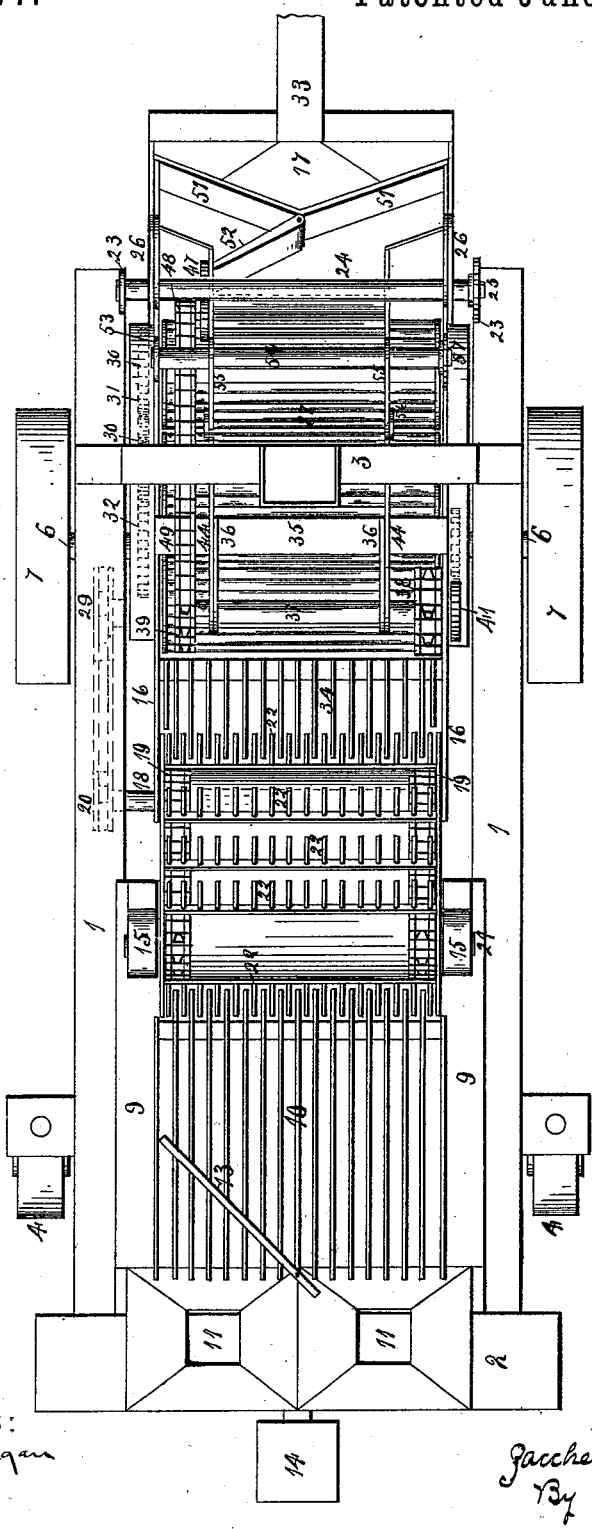

(No Model.) 2 Sheets—Sheet 1.

Z. ERICKSON.
POTATO DIGGER.

No. 541,477. Patented June 25, 1895.

Witnesses:
Frank S. Regan
E. Behel.

Inventor:
Zaccheus Erickson
By A. O. Behel
Atty.

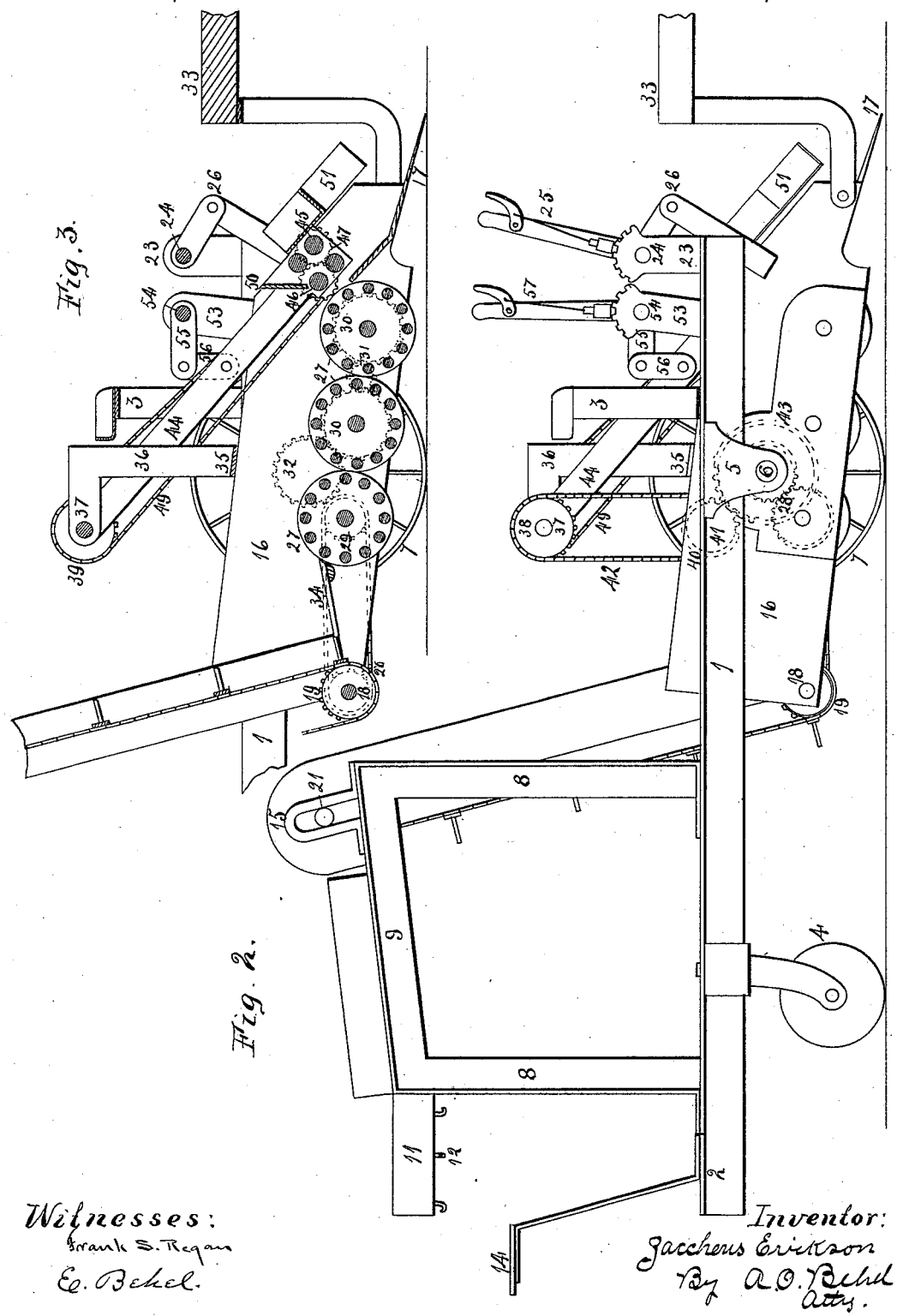

UNITED STATES PATENT OFFICE.

ZACCHEUS ERICKSON, OF ROCKFORD, ILLINOIS.

POTATO-DIGGER.

SPECIFICATION forming part of Letters Patent No. 541,477, dated June 25, 1895.

Application filed February 13, 1895. Serial No. 538,305. (No model.)

*To all whom it may concern:*

Be it known that I, ZACCHEUS ERICKSON, a citizen of the United States, residing at Rockford, in the county of Winnebago and State of Illinois, have invented certain new and useful Improvements in Potato-Diggers, of which the following is a specification.

The object of this invention is to construct a potato digger in which the vines are separated from the dirt and potatoes are delivered to either side of the machine, and in separating the dirt from the potatoes and delivering the potatoes into a suitable receptacle.

In the accompanying drawings, Figure 1 is a plan view of my improved digger. Fig. 2 is a side elevation. Fig. 3 is a vertical lengthwise section of the front portion of the digger.

The main supporting frame of the digger consists of the lengthwise bars 1, connected by the rear cross bar 2, and the seat supporting bar 3. Near the rear end of the frame are supported casters 4 and to the lengthwise bars near their front ends are secured brackets 5, which support stub axles 6, to which the supporting and driving wheels 7, are connected.

A frame composed of the two vertical bars 8, and top bar 9, is located near the rear end of the machine one over each lengthwise bar to which they are secured.

To the top bars is secured a screen composed of the rods 10, arranged in the lengthwise direction of the machine. In rear of this screen are located hoppers 11, from the under face of which depend hooks 12, upon which bags may be supported.

A switch 13, has a pivotal connection with a stationary part of the machine by means of which the potatoes may be directed into either hopper. A seat 14, is supported by the main frame in rear of the hoppers for the attendant placing the bags in position.

To the upper face of the top bars 9 are secured lengthwise slotted brackets 15.

A supplemental frame is located within the main frame at its forward portion, composed of the sides 16, and connected at their front ends by the plow 17. Their rear ends are held separated by a potato elevator, the shaft 18, supporting two sprocket wheels 19, within the side bars of the supplemental frame, and to this shaft outside of the main frame is secured a sprocket wheel 20. The shaft 21, of the upper end of the potato elevator is guided in the brackets 15. An endless carrier is carried by the shafts of the potato elevator, and the fingers 22, will elevate the potatoes and discharge them onto the screen over which they pass into the hoppers. This supplemental frame is supported in a pivotal manner by the stub axles upon which the main driving wheels are mounted.

To the upper face and front ends of the main frame are secured brackets 23, one having its upper end in ratchet form. A shaft 24, is supported by these brackets, and a hand lever 25, is connected to the shaft and is provided with the usual spring latch and thumb lever. This shaft has a connection with the front end of the supplemental frame through the links 26, and by means of the hand lever the front end of the supplemental frame may be raised and lowered to adjust the plow to the proper working depth and raise it out of the ground. This supplemental frame supports a series of rotary carriers 27, each composed of two ends connected by rods.

The rear carrier has a connection with one of the driving wheels through the gears 28, and the other end of the shaft supporting this carrier supports a sprocket wheel 29, which has a chain connection with the sprocket wheel 20, carried by the lower shaft of the potato elevator and through which movement is imparted to the endless apron of the elevator.

The center and forward carriers are connected by the gears 30, and intermediate gear wheel 31, through which proper direction is given to the forward carriers. The center carrier has a connection with the remaining driving wheel through the gear wheel 32.

To the front end of the supplemental frame is connected the tongue 33.

Between the rear carrier and the lower end of the potato elevator are located a series of fingers 34, which incline toward the elevator forming a pocket into which the potatoes and dirt after passing over the carrier are deposited, and this pocket being open work the dirt will sift through and the potatoes will be carried by the elevator.

Across the supplemental frame is secured a bar 35, from which rise arms 36, having their upper ends perforated. A shaft 37, is supported by these arms. A sprocket wheel 38, is secured to one end of this shaft, and a sprocket wheel 39, is secured to the other end of the shaft.

A sprocket 40, and gear wheel 41, are supported by the supplemental frame, the sprocket wheel connected with the sprocket wheel 38, by the chain 42, and the gear wheel having a connection with the gear wheel 43, secured to one of the stub axles, and the movement of the machine over the ground will impart a rotary movement to the shaft 37. From this shaft 37, is suspended a frame supporting the vine elevator and discharge. This frame has the side bars 44, pivotally connected to the shaft 37, at their upper ends. Between these side bars at their forward ends are located two series of rollers in this instance two in each series. The forward roller 45 of the upper series and the rear roller 46, of the lower series are connected by the gears 47, and to the shaft supporting the rear roller 46, is secured a sprocket wheel 48, which is connected by the chain 49, with the sprocket wheel 39, secured to the shaft 37, in order that a rotary movement may be given to the vine elevator rollers. In rear of the rollers is located a deflector board 50, which serves to throw the vines forward after being elevated.

Over the upper series of rollers is placed a vine discharge consisting of the inclines 51, from the center of the machine to either side and a pivoted switch 52, forms the means for discharging the vines to either side of the machine.

To the forward end of the supplemental frame are secured beams 53, one having its upper face in notched form. A shaft 54, is supported by these bearings and has a connection with the vine elevator frame through the links 55 and 56. A hand lever 57, provided with the usual thumb lever is connected to the shaft through which the vine elevator frame can be vertically adjusted, independent of the supplemental frame.

The plow is set the proper depth to raise the potatoes. The rollers of the vine elevator will carry the vines upward a short distance then discharging them upon the ground at the side of the machine from which the potatoes have been dug. Should potatoes cling to the vines they will be pinched off by the rollers. The dirt and potatoes are then carried by the rotary carriers rearward, and a greater portion of the dirt will be removed by the carriers. The potatoes are then deposited in the pocket in rear of the rotary carrier. The potato elevator will take the potatoes from the pocket, elevate them and deposit them upon the screen over which they pass to the hoppers at the rear of the machine.

The upper end of the potato elevator is guided in the elongated bearings which permit of an adjustment. As the potato elevator and plow are supported by the supplemental frame and the supplemental frame pivotally supported by the stub axles, the adjustment of the plow will also impart a movement to the potato elevator.

I claim as my invention—

1. In a potato digger, a main frame supported upon driving wheels, a supplemental frame pivotally supported by the axles of the driving wheels midway of its length, a potato elevator having a pivotal connection with the supplemental frame at its rear end, a plow supported thereby at its forward end, a vine elevator supported by the supplemental frame, a connection between the main frame and supplemental frame for adjusting the supplemental frame, and a connection between the supplemental frame and vine elevator for adjusting the vine elevator.

2. In a potato digger, a vine elevator composed of two series of rollers, located in rear of the plow, a deflector board located in rear of the rollers, and a discharge platform located in front of the rollers having a switch for throwing the vines to either side of the machine.

ZACCHEUS ERICKSON.

Witnesses:
A. O. BEHEL,
E. BEHEL.